(12) United States Patent
Fang et al.

(10) Patent No.: US 9,027,831 B2
(45) Date of Patent: May 12, 2015

(54) UPDATING OF REFERENCE MAGNETIC SIGNATURE FOR AUTHENTICATING A DOCUMENT WITH A MAGNETIC STRIPE

(75) Inventors: Xiang Fang, Redwood City, CA (US); Patrick Faith, Pleasanton, CA (US); Craig M. Kato, Foster City, CA (US); Ayman Hammad, Pleasanton, CA (US); Krishan Prasad Koganti, Cupertino, CA (US)

(73) Assignee: Visa International Service Association, San Francisco, CA (US)

( * ) Notice: Subject to any disclaimer, the term of this patent is extended or adjusted under 35 U.S.C. 154(b) by 372 days.

(21) Appl. No.: 12/276,227

(22) Filed: Nov. 21, 2008

(65) Prior Publication Data

US 2010/0127079 A1  May 27, 2010

(51) Int. Cl.
*G06K 5/00* (2006.01)
*G06K 19/12* (2006.01)

(52) U.S. Cl.
CPC ..................................... *G06K 19/12* (2013.01)

(58) Field of Classification Search
CPC ........ G07F 7/1008; G07F 7/08; G06Q 20/341
USPC ......................................................... 235/380
See application file for complete search history.

(56) References Cited

U.S. PATENT DOCUMENTS

| | | | |
|---|---|---|---|
| 4,650,978 A | 3/1987 | Hudson et al. | |
| 5,235,166 A | 8/1993 | Fernadez | |
| 5,254,843 A | 10/1993 | Hynes et al. | |
| 5,428,683 A | 6/1995 | Indeck et al. | |
| 5,546,462 A | 8/1996 | Indeck et al. | |
| 5,616,904 A | 4/1997 | Fernadez | |
| 5,625,689 A | 4/1997 | Indeck et al. | |
| 5,770,846 A | 6/1998 | Mos et al. | |
| 5,920,628 A | 7/1999 | Indeck et al. | |
| 6,098,881 A | 8/2000 | Deland, Jr. et al. | |
| 6,260,146 B1 | 7/2001 | Mos et al. | |
| 6,431,445 B1 | 8/2002 | DeLand, Jr. et al. | |
| 6,476,991 B1 | 11/2002 | Fernandez et al. | |

(Continued)

FOREIGN PATENT DOCUMENTS

FR    2902548 A1    12/2007

OTHER PUBLICATIONS

U.S. Appl. No. 12/276,224, Faith et al.

(Continued)

*Primary Examiner* — Rafferty Kelly
(74) *Attorney, Agent, or Firm* — Kilpatrick Townsend & Stockton, LLP

(57) ABSTRACT

Methods, systems, and apparatus for accurately authenticating a document (e.g. a credit card) having a magnetic stripe are provided. The magnetic field at different points of the magnetic stripe are measured, e.g., by a checkout scanner to create a magnetic signature. Digital samples of the measurements may be used to create a representation of the magnetic signature. The representation can then be compared to reference values to produce a measure of the authenticity of the document. The reference values are updated over time to reflect changes in the magnetic stripe of the authentic document, as may occur due to physical deterioration. For example, reference values may be optimized based on recent measurements of the authenticated document to provide a more accurate determination of authenticity for future measurements.

21 Claims, 10 Drawing Sheets

(56) References Cited

U.S. PATENT DOCUMENTS

| | | | |
|---|---|---|---|
| 6,708,884 B1* | 3/2004 | Su et al. ............... | 235/462.09 |
| 6,830,183 B2 | 12/2004 | Von Mueller et al. | |
| 6,899,269 B1 | 5/2005 | Deland | |
| 7,090,130 B2 | 8/2006 | DeLand, Jr. et al. | |
| 7,210,627 B2 | 5/2007 | Morley, Jr. et al. | |
| 7,478,751 B2 | 1/2009 | Morley, Jr. et al. | |
| 2002/0145050 A1* | 10/2002 | Jayaratne ................ | 235/492 |
| 2003/0133605 A1 | 7/2003 | Tannhof et al. | |
| 2003/0219145 A1 | 11/2003 | Smith | |
| 2003/0225708 A1 | 12/2003 | Park | |
| 2004/0127256 A1 | 7/2004 | Goldthwaite et al. | |
| 2005/0006472 A1 | 1/2005 | Verschuur | |
| 2005/0173530 A1 | 8/2005 | DeLand et al. | |
| 2005/0218229 A1 | 10/2005 | Morley et al. | |
| 2006/0016879 A1 | 1/2006 | Kean | |
| 2007/0181670 A1 | 8/2007 | Donovan et al. | |
| 2008/0215887 A1 | 9/2008 | Hart et al. | |
| 2010/0127065 A1 | 5/2010 | Fang et al. | |

OTHER PUBLICATIONS

U.S. Appl. No. 12/276,212, Faith et al.
U.S. Appl. No. 12/276,095, Faith et al.
MagnePrint Benefits, www.magtek.com, 1 page, 2008.
MagnePrint Brochure, www.magtek.com, 2 pages, 2008.
MagnePrint Brochure: "Finally . . . a secure transaction card . . . " www.magtek.com, 8 pages., 2008.
MagnePrint Demo Guide, "For card security that can't de duplicated", www.magtek.com, 12 pages., 2008.
International Search Report of the International Searching Authority for Application No. PCT/US2009/065303, mailed on Jun. 29, 2010, 7 pages.
Written Opinion of the International Searching Authority for Application No. PCT/US2009/065303, mailed on Jun. 29, 2010, 4 pages.
Office Action from U.S. Appl. No. 12/276,212 mailed Sep. 22, 2010 (7 pages).
Office Action from U.S. Appl. No. 12/276,224 mailed Oct. 22, 2010 (7 pages).
Office Action from U.S. Appl. No. 12/276,095 mailed May 11, 2011 (14 pages).
Supplemental European Search Report in Application No. EP09828284.1, mailed Jul. 27, 2012.
European Communication mailed on Apr. 23, 2013 for EP Patent Application No. 09828284.1, 5 pages.
Non-Final Office Action mailed on Mar. 24, 2011 for U.S. Appl. No. 12/276,224, 6 pages.
Notice of Allowance mailed on Mar. 23, 2011 for U.S. Appl. No. 12/276,212, 9 pages.
Notice of Allowance mailed on Sep. 6, 2011 for U.S. Appl. No. 12/276,224, 10 pages.
Patent Examination Report No. 1 dated Jul. 3, 2014 for Australian Patent Application No. 2009316464, 4 pages.
Notice of Allowance issued on Oct. 17, 2011 for U.S. Appl. No. 12/276,095, 7 pages.

* cited by examiner

UPDATING OF REFERENCE MAGNETIC SIGNATURE FOR AUTHENTICATING A DOCUMENT WITH A MAGNETIC STRIPE

CROSS-REFERENCES TO RELATED APPLICATIONS

This application is related to concurrently filed U.S. Patent Applications: entitled "REPRESENTING A SIGNATURE OF A MAGNETIC STRIPE FOR AUTHENTICATING A DOCUMENT" by Fang et al. (U.S. application Ser. No. 12/276,212, now U.S. Pat. No. 7,967,203); and entitled "VERIFYING CARDHOLDER IDENTITY USING SIGNATURE OF THE CARD" by Fang et al. (U.S. application Ser. No. 12/276,095, now U.S. Pat. No. 8,118,220); and entitled "AUTHENTICATION OF DOCUMENTS HAVING MAGNETIC STRIPE" by Fang et al. (U.S. application Ser. No. 12/276,224, now U.S. Pat. No. 8,104,677), the disclosures of which are incorporated by reference in their entirety.

BACKGROUND

Embodiments of the present invention relate generally to authenticating a document having a magnetic stripe, and more specifically to authenticating a unique magnetic characteristic of a card (e.g. a credit card).

Documents having a magnetic stripe have long been used for a variety of different purposes. Such documents are currently used in large numbers, e.g., credit cards, debit cards, I.D. cards, etc. Typically the magnetic stripes of such cards carry recorded data relating to the use of the card, and in some instances relating to the assigned user or owner of the card.

Although magnetic stripe cards are widely and successfully used in commerce and industry, counterfeiting these cards is a common occurrence, which can result in great losses. For example, if a counterfeiter obtains an authentic credit card (or the recorded data on the card), the counterfeiter can create a new credit card, which could be used to make unauthorized transactions. Consequently, the ability to reliably verify the authenticity of a card (or other document) having a magnetic stripe is important.

One method for verifying the authenticity of a card uses certain magnetic characteristics of the magnetic stripe to identify cards. Generally, the magnetic stripes of individual cards possess inherent, substantially unique, magnetic characteristics (often referred to as a fingerprint or signature). This fingerprint is related to a noise-like component that results from the manufacturing process of the magnetic stripe.

Current methods convert the magnetic noise to a binary number based on a measured magnetism of specific parts of the magnetic stripe. This binary number is then directly compared bit-by-bit to a reference binary number resulting from an original scan (measurement) of the card and/or independently to previously authenticated scans. The total of the bit-by-bit differences may then be compared to a threshold value to determine whether the card is authentic.

A problem with the current methods is that the magnetic stripe of the authentic document degrades over time and use. A result is that the ability to accurately identify the authentic document can be compromised. This is important as a part of authenticating a document is not only to identify non-authentic documents, but to also identify when the authentic document is being used.

It is therefore desirable to have methods, systems, and apparatus that continue to accurately authenticate a document having a magnetic stripe, particularly even after many uses of the document.

BRIEF SUMMARY

Embodiments of the present invention provide methods, systems, and apparatus for accurately authenticating a document (e.g. a credit card) having a magnetic stripe. The magnetic field at different points of the magnetic stripe is measured, e.g., by a checkout scanner to obtain a reading of the magnetic signature. Based on the measurements, a representation of the magnetic signature may be created in any number of formats, e.g. using a Fourier transform. The representation of the magnetic signature is then compared (e.g. by a credit card processing entity) to a reference signature (e.g. values in the same representation).

To account for degradation over time and/or use, the reference signature is updated, e.g. periodically over time or in response to other factors. As a result of the update, the new magnetic signature is compared to a combination of previously received magnetic signatures. In one embodiment, these previously received magnetic signature used in the combination were deemed authentic or had a high probability of being authentic. In this manner, the effective reference signature may advantageously be in a state that accurately reflects the current state of the authentic magnetic stripe.

In one embodiment, reference values (e.g. for the digital samples or the transform coefficients) may be optimized based on recent measurements of the authenticated document to provide a more accurate determination of authenticity for future measurements.

According to one exemplary embodiment, an authentication device receives a set of values representing the magnetic characteristic. The received values are compared to reference values. The comparing includes determining an error for each received value, wherein each error includes a sum of contributions, each corresponding to a different set of previously received values representing the magnetic characteristic. Based on the comparison, a measure of an authenticity of the document is provided.

Other embodiments of the invention are directed to systems, scanners, and computer readable media associated with the above-described methods.

As used herein, a continuous function is a function for which small changes in the input result in small changes in the output. For example, a cosine function $Y=\cos(X)$ would be continuous as a small change in X produces a small change in Y. However, a delta function $Y=\delta(X)$ (which equals infinity for $X=0$ and equals zero otherwise) is discontinuous as a small change from $X=0$ will cause a very large change in Y. Such description will be familiar to one of skill in the art.

A continuous function that spans a segment (e.g. a distance along a magnetic stripe) has non-zero values for at least a plurality of points along the segment. For example, although the cosine function may have a zero at a particular point of the segment (depending on the offset used), the cosine function is defined throughout all space and has non-zero values for other points.

A better understanding of the nature and advantages of the embodiments of the present invention may be gained with reference to the following detailed description and the accompanying drawings.

DETAILED DESCRIPTION

Embodiments of the present invention provide methods, systems, and apparatus for efficiently authenticating a document (e.g. a credit card) having a magnetic stripe. The magnetic field at different points of the magnetic stripe may be measured, e.g., by a checkout scanner to create a magnetic signature. The digital samples of the measurements can then be represented in any number of suitable ways, e.g. a binary number or coefficients of continuous basis functions, such as a Fourier transform. These coefficients are then compared (e.g. by a credit card processing entity) to reference coefficients to produce a measure of the authenticity of the document. Reference values (for the digital samples or the transform coefficients) may be based (e.g. optimized) on recent measurements of the authenticated document to provide a more accurate determination of authenticity for future measurements.

Figure 1A:
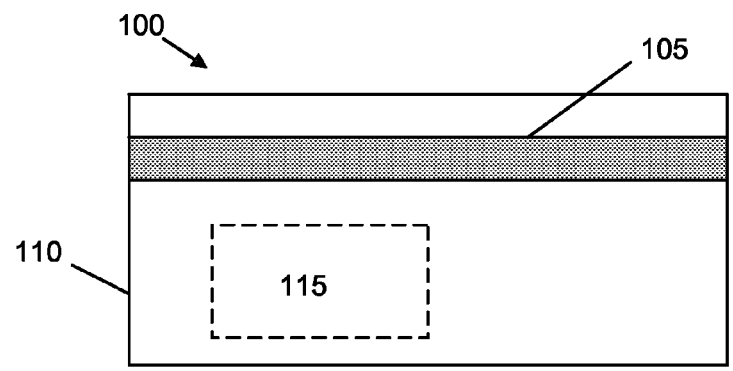
FIG. 1A shows a document 100 including a magnetic stripe 105 according to an embodiment of the present invention.

FIG. 1A shows a document 100 including a magnetic stripe 105 according to an embodiment of the present invention. In this embodiment, the document 100 is a card having a plastic substrate 110. Consumer information 115 such as an account number, expiration date, and consumer name may be printed or embossed on the card. Document 100 may include, for example, smart cards, ordinary credit or debit cards, and stored value cards.

Information in the magnetic stripe may be in the form of data tracks that are traditionally associated with credits cards. In some embodiments, such tracks include Track 1 and Track 2. Track 1 ("International Air Transport Association") stores more information than Track 2, and contains the cardholder's name as well as account number and other discretionary data. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN data, plus other discretionary data.

When used for a transaction (e.g. a purchase), the card is swiped though a scanner, for example, at a point of sale terminal. The scanner obtains an account identifier (such as a credit card number), which is then sent for authorization of the purchase, e.g., to a payment processing network as described below. However, as mentioned above, data recorded on the card may be copied to a different card.

Figure 1B:
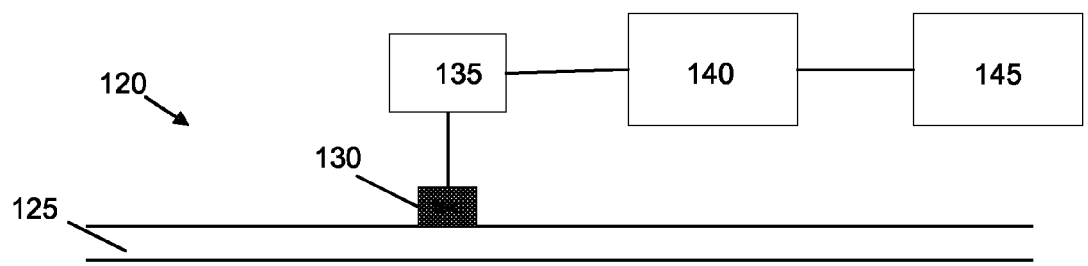
FIG. 1B shows a scanner 120 according to an embodiment of the present invention.

FIG. 1B shows a scanner 120 according to an embodiment of the present invention. The scanner may include a channel 125 for guiding a swipe of the card. A magnetic read head 130 senses magnetic fields in the magnetic stripe of the card and creates an electric (analog) signal based on the sensed magnetic fields. The magnetic fields may be the result of data (e.g., a "1" or a "0") recorded on the magnetic stripe.

An analog-to-digital converter 135 samples the analog signal at periodic intervals and creates a digital value based on the analog value at the sample values. The digital values may be in binary form or in any other base number (e.g. decimal or base 5).

A processor 140 receives the digital values and processes them to create a representation of the magnetic characteristic (signature). In one embodiment, the representation includes digital values corresponding to specific points of the card. In one aspect, the points are two dimensional regions of the magnetic stripe. In another embodiment, the representation includes expansion coefficients of continuous basis functions, as will be described later.

The processor 140 is communicably coupled with a network interface 145 that can be communicably coupled with an external device (e.g. an authentication device) for comparing the representation (e.g. the expansion coefficients) to a reference representation (e.g. values from an original scan of the card). In another embodiment, the processor 140 can perform the comparing. The processor 140 may be part of or be a computing device that determines a magnetic signature of the document. Also, the processor 140 may be enclosed in a separate housing from any scanning device.

Figure 1C:
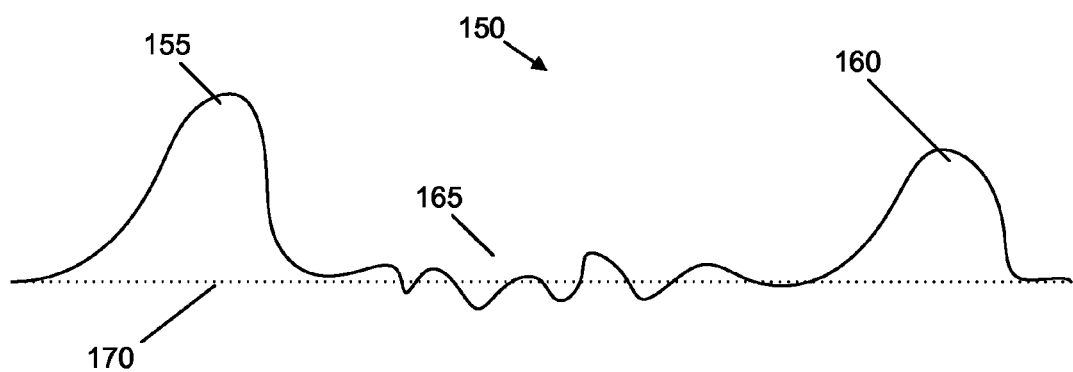
FIG. 1C shows an analog signal 150 obtained from a magnetic read head according to an embodiment of the present invention.

FIG. 1C shows an analog signal 150 obtained from a magnetic read head according to an embodiment of the present invention. The Y (vertical) axis is the voltage of the analog signal, which corresponds to a strength and/or direction of a magnetic field created by a small part of the magnetic stripe. The X (horizontal) axis is time. The time does correspond to a particular part of the magnetic card. Which particular part of the card that the time corresponds depends on the swipe speed of the card. The line 170 denotes a reference voltage, which may be zero or any other value or polarity.

The peaks 155 and 160 correspond to data that has been written onto the magnetic stripe (e.g. a bit of the account number). The space between the peaks is relatively flat and includes noise 165, which may be used as a magnetic signature of the card. U.S. Pat. No. 6,098,881 issued to Deland et al., the entire disclosure of which is incorporated herein by reference, is directed to using "relatively flat" portions representative of the remnant noise characteristics of the stripe that are located between magnetic transitions to authenticate individual documents. Noise on top of the recorded data may also be used, but this may be more difficult to separate.

The noise 165 in the space may be amplified by an amplifier in the read head 130, between the read head and the ADC 135, or in the ADC. This extra amplification may be triggered to occur in between the data peaks 155 and 160. Typically the data peaks 155 and 160 are sampled and turned into bits of 0 or 1. The digital samples of the noise 165 may be binary, decimal, or any other base number.

In one aspect, the noise 165 in the magnetic stripe is the result of the manufacturing process. To create the stripe, magnetic particles are laid down essentially in a random orientation. Thus, different parts of the stripe will have different levels of magnetism, prior to writing data onto the cards, thereby providing a signature for that specific card.

In one embodiment, a magnetic signature may be taken from one or more predetermined segments of the card. For example, spaces in between multiple data bits may be used. Each space may be used as a separate signature, or as components of the same signature.

Figure 2:
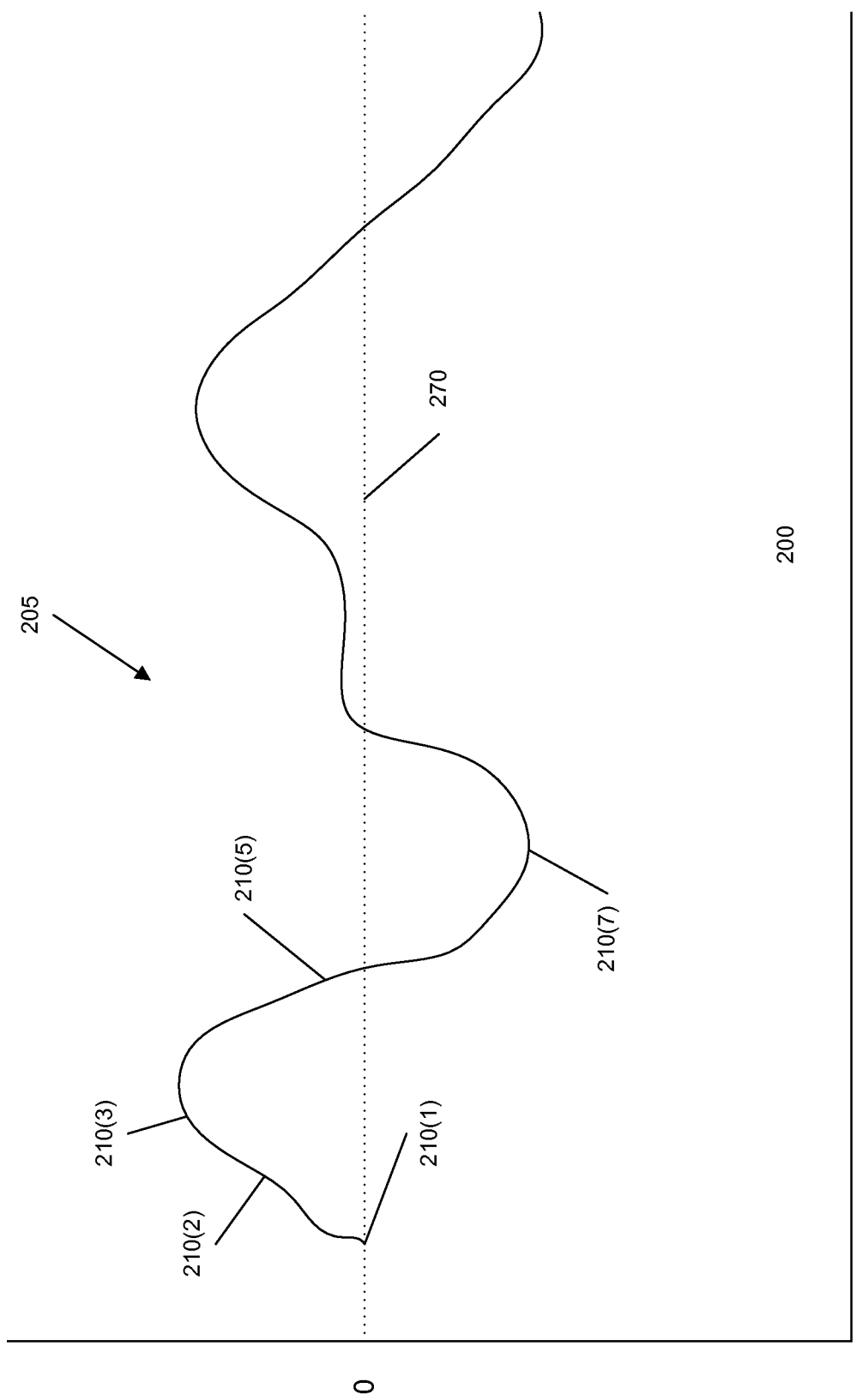
FIG. 2 shows a plot 200 of an analog signal 205 that may be sampled to create a magnetic signature of a document according to an embodiment of the present invention.

FIG. 2 shows a plot 200 of an analog signal 205 that may be sampled to create a magnetic signature of a document according to an embodiment of the present invention. As in FIG. 1C, the Y axis is the voltage of the analog signal, and the X axis is time. The time does correspond to a particular part of the magnetic card and depends on the swipe speed of the card. The line 270 is a reference voltage, which is marked as zero. In one embodiment, a sensed magnetism in one direction causes a positive voltage, and a sensed magnetism in another direction provides a negative voltage (relative to the reference voltage 270).

As mentioned above, the analog signal 205 is sampled at periodic intervals, e.g., by the ADC 135. Points 210 show points at which a digital sample is taken. In one embodiment, the point 210(1) of the analog signal results in a zero value. In one aspect, increases from point 210(1) create a positive sample value, and decreases result in a negative sample value.

In one embodiment, the point 210(2) receives a value of 1 and the point 210(3) receives a value of 2. In one embodiment, the values could be 5 and 9, respectively, depending on the maximum and minimum digital values to be used.

The digital values may then be processed, e.g. by processor 140, to determine a representation for the magnetic characteristic. In one embodiment, a representation would be simply using the digital sample values themselves. However, the number of sample values may be very large.

In another embodiment, the representation would look at several sample values over a range. For example, a range may be from 210(1) to 210(5), and an average of the values could be used to determine a new value for that range. In one aspect, the new value could be a binary value. In such an instance, the binary value in this case would most likely be 1.

In another embodiment, the digital sample values are taken as points of a function $F(X_I)$, where $X_I$ is a sample point. The function $F(X_I)$ is then expressed as a series (expansion) of basis functions $G(X_I)$, e.g., continuous basis functions (such as sines or cosines), providing $$F(X) = \sum_{k=0}^{N-1} C_k G_k(X).$$

The expansion coefficients $C_K$ may then be used as the representation of the magnetic characteristic in the functional space of G. Typically, the basis functions G are of a same family, such as Legendre polynomials, Fourier functions (e.g., plane waves and sines/cosines), wavelets, and other like continuous functions.

In one embodiment, the basis functions $G_k(X)$ provide a Fourier expansion, e.g. using sines or cosines. The expansion coefficients may then be obtained by taking a Fourier transform of the sample points, thus converting the real space representation to a Fourier space representation. An advantage of such a representation is that alignment of the values of the representation would not be as tightly required relative to the reference representation. For example, an oscillating waveform would have the same Fourier components even if it is shifted by an amount in real space.

One skilled in the art will appreciate the numerous different basis functions that may be used, such as wavelet, fast Fourier transform (FFT), local Fourier transforms, and polynomials. The basis functions may be orthogonal or non-orthogonal. In one embodiment, the basis functions will span the entire space that the sample values cover. Fourier basis functions are such a type of function as they may represent any non-zero function throughout any range.

In one embodiment, the basis functions G may include a window cut off function. Such a window function may be used to localize the continuous basis functions to a certain segment of real space (e.g. distance along the magnetic stripe). This may be desirable depending on the type of transform or expansion that is used.

In one embodiment, local discrete cosine transforms (LDCT) are used to determine the representation. In this case, the expansion coefficients may be calculated as $$Cj = \sum_{k=0}^{N-1} A_k B_k \cos\left(\pi \frac{\left(k+\frac{1}{2}\right)j}{N}\right), \text{ where } \{B_0, B_1, \ldots, B_{N-1}\}$$

is a window cut off function, $\{A_0, A_1, \ldots, A_{N-1}\}$ are the sample values, and $\{C_0, C_1, \ldots, C_{N-1}\}$ are the expansion coefficients. If the number of basis functions is less than the number of sample points, then a fitting algorithm (such as a least squares optimization) may be used to determine the expansion coefficients.

In one aspect, a DCT (Discrete Cosine Transform) has a good information concentration property, which means that most of the digital information tends to be concentrated in a few coefficients of the DCT. Such a transform can approach the Karhunen-Loève transform, which is optimal in the de-correlation sense. Thus, using DCT, digital information can be represented with a fewer bits.

In embodiments that use orthogonal transform, a digital signal can be more easily transformed into a different domain without any effective loss of information. This is in part because adding more functions necessarily provides greater accuracy in the representation. For example, the cosine function based orthogonal transform transforms data into a domain where its information is represented as frequencies.

Figure 3A:
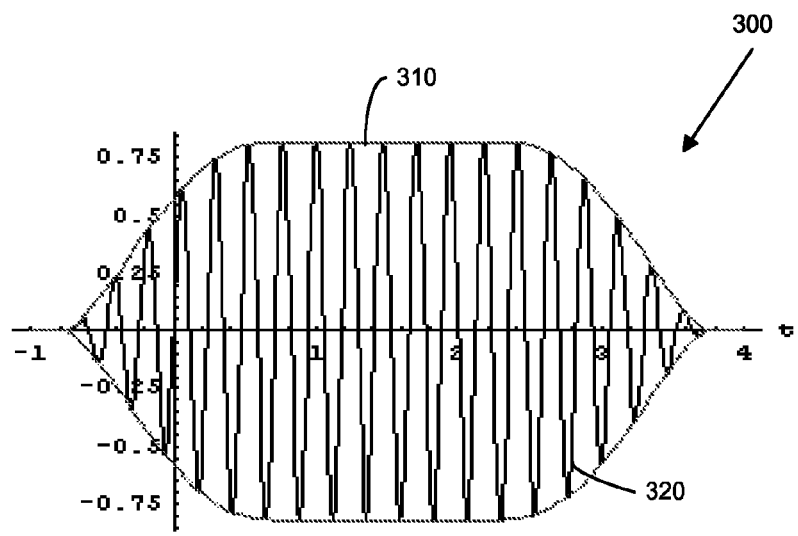
FIG. 3A is a plot 300 of a LDCT basis function according to an embodiment of the present invention.

FIG. 3A is a plot 300 of a LDCT basis function according to an embodiment of the present invention. As one can see, the basis function is continuous, and it is local (not strictly zero) over a particular range. The outer envelope 310 of the oscillating function 320 may be defined by the window cutoff function B. The cutoff function B causes the function to be zero or effectively zero (very small) outside of a window, which would coincide with the segment for the magnetic characteristic. These basis functions may be used to represent a particular segment of a magnetic signature or all of the segments of a signature.

Figure 3B:
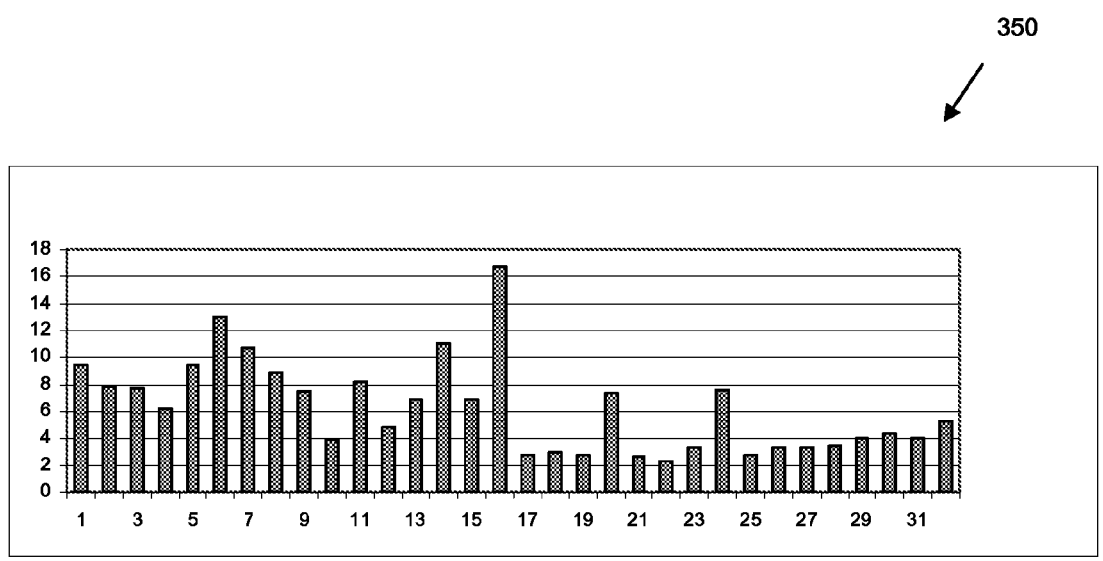
FIG. 3B is a histogram 350 of the expansion coefficients of a representation of a magnetic signature according to an embodiment of the present invention.

FIG. 3B is a histogram 350 of the expansion coefficients of a representation of a magnetic signature according to an embodiment of the present invention. The Y axis is the value of each coefficient. The X axis is the index value of the expansion coefficient. The histogram 350 is often called a spectrum, particularly when oscillating basis functions are used (such as sines and cosines).

In one embodiment, fewer expansion coefficients C than sample points A are used to represent the magnetic characteristic. For example, 128 sample bits may be used, but only 32 expansion coefficients may be used for the representation of the signature. However, the 32 expansion coefficients still describe the magnetic characteristic over the entire range of the signature. In one aspect, the lowest K expansion coefficients are sent. The spectrum of the representation is said to be 32 since this is the number of basis functions used to represent the signature.

An advantage of using coefficients of basis functions is that the magnetic signature may be represented more accurately and/or using less numerical values, than does a bit-by-bit representation of the magnetic field in a particular point of the magnetic stripe. Since less numerical values are required to be sent from a scanner to an authentication entity, the leftover bandwidth may be used for additional data. For example, a non-symmetric key (which uses more data) may be used to encrypt the data.

Figure 4:
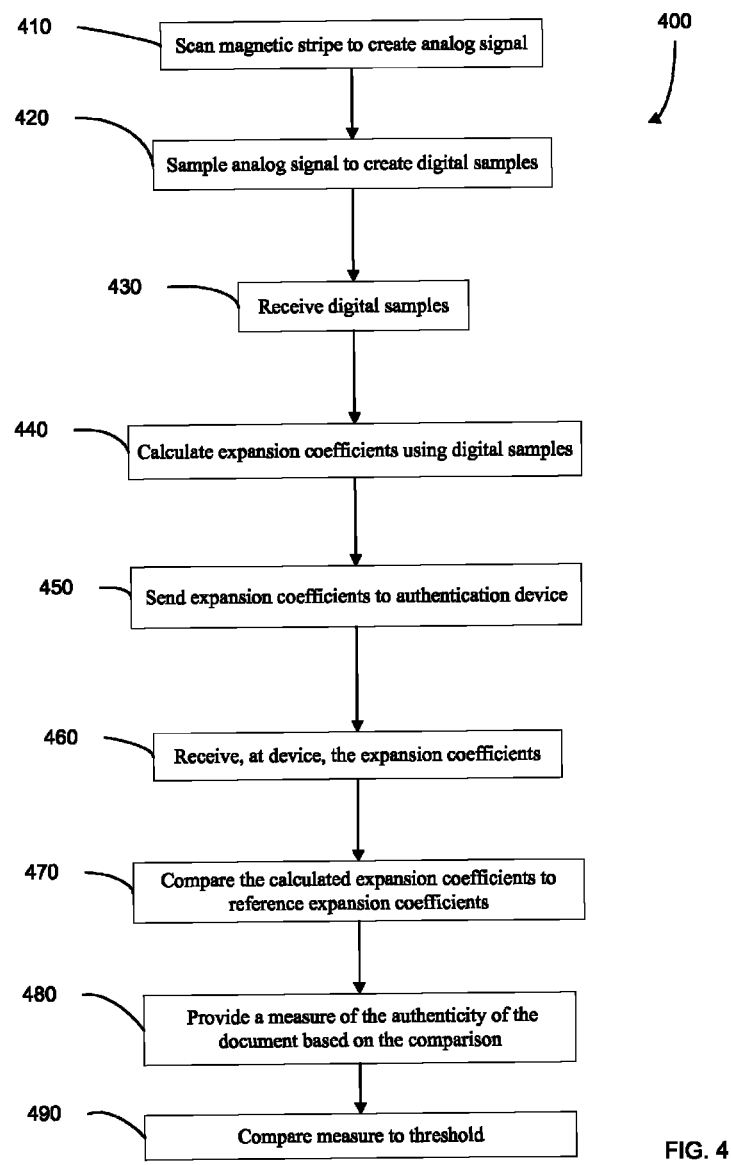
FIG. 4 is a flowchart of a method 400 for authenticating a document having a magnetic stripe according to an embodiment of the present invention.

FIG. 4 is a flowchart of a method 400 for authenticating a document having a magnetic stripe according to an embodiment of the present invention. As mentioned above, the magnetic stripe has a distinct magnetic characteristic that occurs over one or more predetermined segments of the magnetic stripe.

In step 410, the magnetic stripe of a document (e.g. a card) is scanned to create an analog signal. The scanning may occur at a checkout stand using a point of transaction (POT) terminal (such as a point of sale (POS) terminal) that includes a scanner. Note that as used herein a POS terminal may also be a POT terminal. The card is swiped though the POS terminal so that a magnetic read head reads local magnetic fields as the card is being swiped. A time-varying analog electrical signal, which corresponds to the sensed magnetic fields, is thus created. In another embodiment, a portable device may perform the scanning.

In step 420, the analog signal is sampled to create the digital samples. For example, the ADC 135 can sample the analog signal and create corresponding digital values. The number of sample points may be made much larger than the eventual representation of the signature. The digital values may fall within any range of numbers (e.g., −2 to 2, 0 to 6, etc.).

In step 430, the digital samples of the analog signal representative of the magnetic characteristic are received at a processor, e.g. processor 140 of a computing device. In one embodiment, the processor is in a POS terminal. In another embodiment, the processor is not in the POS terminal, but still on an internal network on which the POS terminal resides. For example, the POS terminal may be connected to a processor located in the same store. In yet another embodiment, the processor may be remote from the POS terminal.

In step 440, the processor calculates a plurality of expansion coefficients of a set of continuous basis functions based on the digital samples. As mentioned above, the expansion coefficients may be determined by performing a transform (e.g. a fast Fourier transform, or LDCT) on the digital sample values. Other fitting or optimization algorithms may also be used to determine the best or suitable coefficients that when coupled with the basis functions provide the approximate values of the digital samples.

In step 450, the expansion coefficients are sent to an authentication device that compares the calculated expansion coefficients to reference expansion coefficients, thereby providing a measure of the authenticity of the document. In one embodiment, the expansion coefficients are sent as part of a message (e.g. an authentication request) from a POS terminal to a payment processing network.

An "authentication device" may include, for example, one or more computer apparatus of a payment processing network, a server computer at an issuer of a credit card (or other document), a POS terminal, or a mobile phone.

In one embodiment, the scanner can perform the transformation and send only the prescribed coefficients, which may be relatively small compared to the number of digital samples. Thus, bandwidth is advantageously saved and may be used for other purposes.

In step 460, the authentication device receives the expansion coefficients of a set of continuous basis functions based on digital samples of an analog signal representative of the magnetic characteristic. As stated above, the expansion coefficients may be received as part of a message that contains data recorded on the document (card), such as an account number. The message may be sent via any suitable network protocols, such as TCP, IP, HTTP, SMTP, and FTP.

In step 470, the authentication device compares the calculated expansion coefficients to reference expansion coefficients. In one embodiment, the comparison includes a difference between each expansion coefficient and the corresponding reference coefficient. The differences may be summed, given different weights, or provided as multiple inputs to another function. In another embodiment, a difference between functions that receive the expansion coefficients and the reference coefficients is taken.

In one embodiment, the authentication device may be part of the same system that creates the representation of the magnetic signature. For example, an access device (such as a mobile) phone may generate the representation of the magnetic signature (e.g. using a scanning device as described above) and perform the comparison to the reference signature.

In step 480, based on the comparison, a measure of the authenticity of the document is provided. In one embodiment, the measure is a binary result (such as authentic or not). In another embodiment, the measure is a probability score in a range (e.g. 0 to 100) with differing values providing less or more probability of the document being authentic. The measure may occur in discrete values (or categories) or in continuous values.

For example, if the expansion coefficients and the reference coefficients are identical, then a difference could yield a zero potentially providing a measure of 100% authenticity. Note that the resulting zero could be taken as the measure or the percentage could be replaced by any value as a maximum score. In one embodiment, a measure providing a 0% probability of authenticity may be defined as any expansion coefficients that provide a difference greater than a specified value. In another embodiment, negative values may be used so that there is no specified minimum as to a measure of authenticity.

In step 490, the measure may be compared to one or more threshold values. In one embodiment, the measure (e.g. a score) is compared to a threshold to determine a binary result for authenticity. For example, a probability score may be compared to a threshold; and if the score is greater, then the document is considered authentic. In another embodiment, the measure may be compared to multiple threshold values to provide discrete categories as to the level of authenticity.

The results of step 480 or 490 may then be used with other factors to determine a final risk level of a transaction. The risk levels may be discrete (such as binary or more categories) or continuous. For example, a probability score may be combined with other factors (such as the amount of the transaction, the merchant from which the message was sent, a history of the consumer account) to provide a risk level associated with the transaction. In one embodiment, the risk level may occur in discrete values, e.g. on a scale of 1 to N (e.g. 5) or in continuous values. Any of the measures, risk levels, scores, or values may be provided or displayed to other entities (such as the consumer, a merchant, or other computers involved in the transaction).

The value(s) to use as threshold may be determined by analyzing the behavior of the measure (e.g. score) resulting from steps 480. In such a manner, a threshold may be chosen that can accurately differentiate between an authentic document and a non-authentic document. The threshold may be a static value or it may be dynamic.

Figure 5:
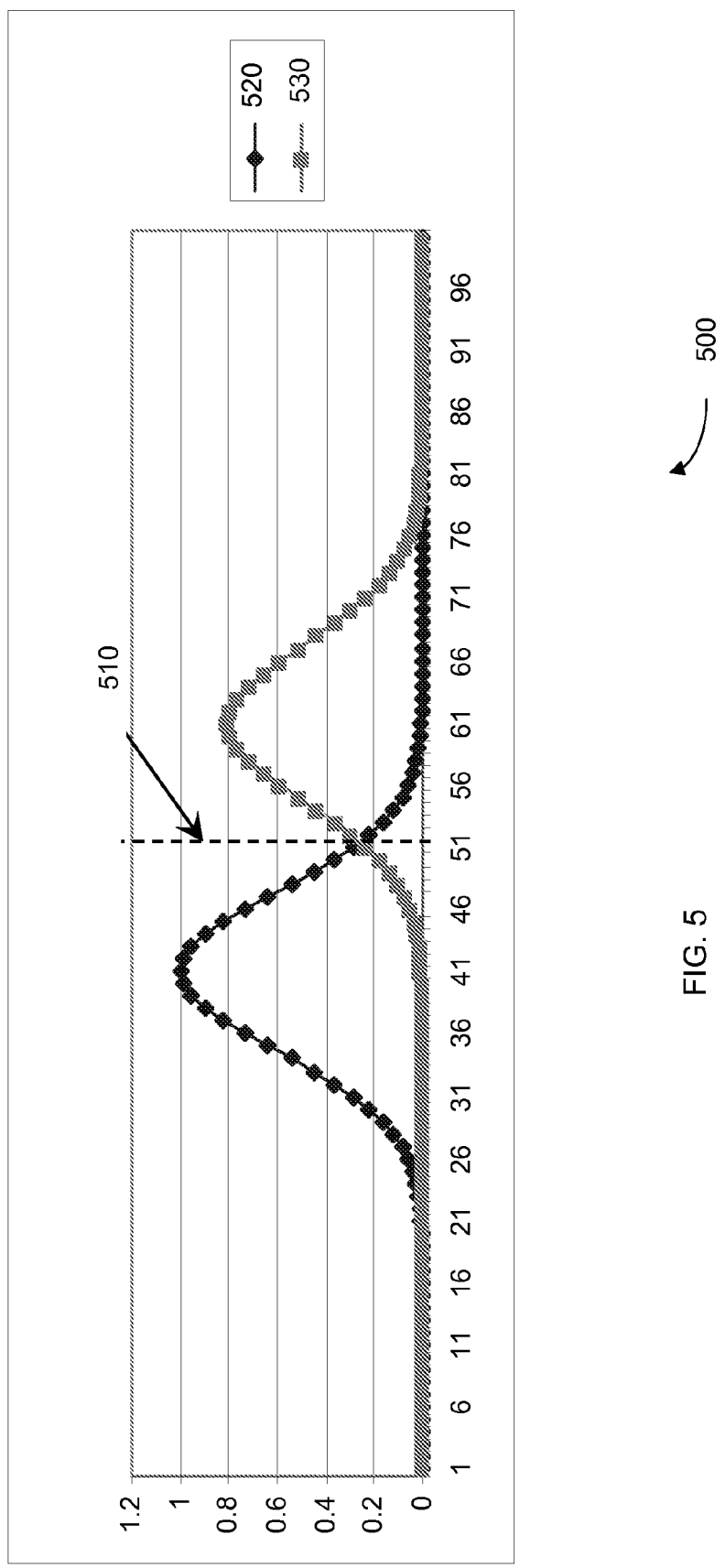
FIG. 5 is a plot 500 showing a determination of a threshold according to an embodiment of the present invention.

FIG. 5 is a plot 500 showing a determination of a threshold according to an embodiment of the present invention. FIG. 5 shows two distributions 520 and 530. The X axis is a score correlating the sensed representation (e.g. expansion coefficients when the method 400 is used) to the reference representation. A score of 100 means a highest agreement with the reference and a 0 means a lowest agreement with the reference. The Y axis relates a number of times (frequency) that a sensed card had a particular score compared to a reference representation.

The distributions may be calculated using a fit to the points, or may be a simple interpolation. The fit may use any standard distribution functions such as a Gaussian, normal, or other suitable distribution.

The distribution 520 shows the distribution of scores from multiple different cards, which are not the authentic card. These scores were determined by swiping the cards through a scanner, comparing a representation of a magnetic signature, and determining the score. The distribution 530 is for signatures from the authentic card. These scores were determined from multiple swipes of the authentic card through a scanner. As one can see the score is typically not 100 all of the time for different swipes of the same card, nor is the score 0 for all of the swipes of a different card.

In one embodiment, a threshold method searches the best position where the overlap of two distributions is minimized. Such a threshold method may provide a compromise between false negative and false positives. In plot 500, the false negatives are the points of distribution 530 that are to the left of the threshold line 510. The false positives are the points of distribution 520 that are to the right of the threshold line 510. Since neither one of these inaccurate categorizations of the card is desirable, it is generally not good to obtain zero false negatives, only to allow more false positives, or vice versa. Thus, in one aspect, the intersection of the two distributions is taken as a threshold, as shown in plot 500.

This threshold may be used as a static value for all cards of a similar type. For example, it may be determined that a threshold of 51 provides an accurate value given the distribution of scores to be expected for a particular type of card. The threshold may also be dynamic in that a new distribution may be determined for each new data point obtained. The new data points may be particular to a specific card, and thus each card would have specific distributions, and thus different thresholds.

In one embodiment, all cards of the same type would start with the same threshold. But, with each new score (or every N new scores) associated with that card, the distribution would be updated and a new threshold calculated. Additionally, the reference representation of the signature may be updated periodically as new scores are received. Such methods will now be described.

Figure 6:
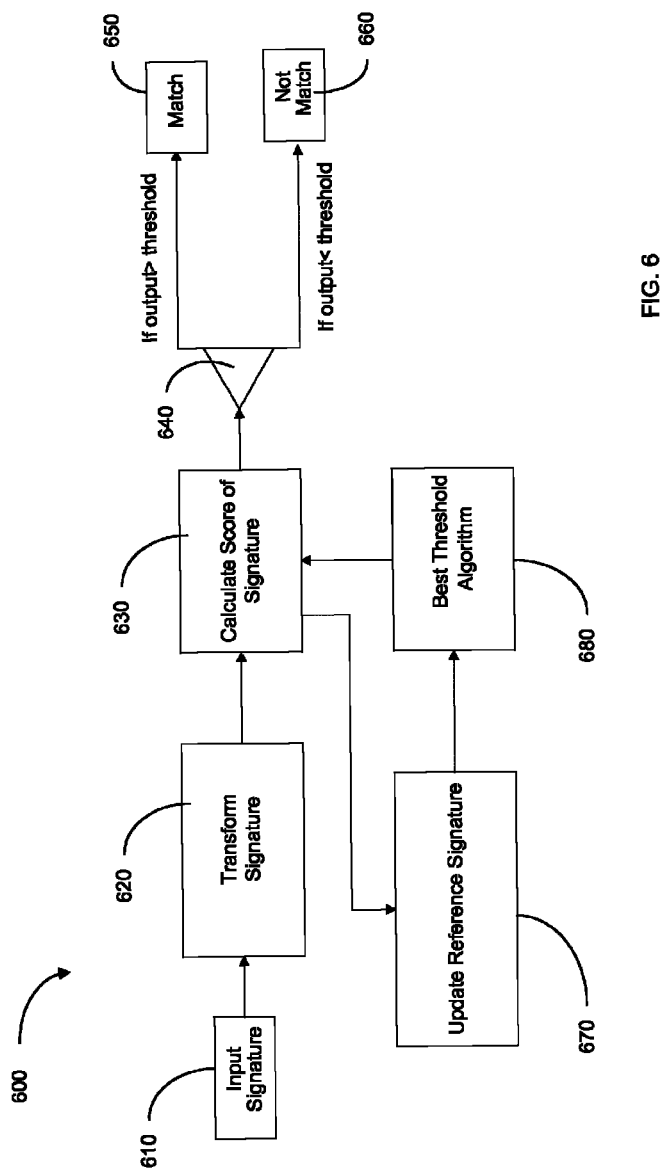
FIG. 6 shows a block diagram of a method for authenticating a document according to an embodiment of the present invention.

FIG. 6 shows a block diagram of a method 600 for authenticating a document according to an embodiment of the present invention. The steps may be done by different entities. For example, steps 610 and 620 may be performed by a POS terminal, while the rest of the steps may be done by an authentication entity (such as a payment processing network).

In block 610, a sensed signature is received, or otherwise input, into the system. In one embodiment, the input signature is the analog signal resulting from the sensing of the magnetic stripe. In another embodiment, the input signature is the digital sample values resulting from an AD conversion of the analog signal.

In block 620, the signature is transformed. In one embodiment, the digital samples are transformed into a representation of continuous basis functions by calculating expansion coefficients of the basis functions, as described herein. For example, a transformation may be made from the real space digital samples into a frequency space spanned by the basis functions. For a frequency representation, each coefficient would represent a different frequency of oscillation of the data point values. In another embodiment, the transformation is simply a conversion of the analog input signature into digital samples.

In block 630, a measure (e.g. a score) is calculated by comparing the transformed signature values to the reference values. The measure may be calculated in a manner as described herein. In one embodiment, the algorithm may perform a correlation match, e.g. by calculating an error (e.g. a difference) between the values.

In one embodiment, the score is a distance, or error of an EM signature to the reference signature, thus it is a measure of a correlation. In one aspect, the higher score, the closer the sensed signature is to the reference signature.

In block 640, the calculated score is compared to a threshold value. In one embodiment, the threshold (e.g. threshold 510) is calculated by the intersection of two distributions, as shown in FIG. 5. The threshold value may be one that was previously received from block 680 or a threshold value that was just received from block 680 (i.e. was updated in response to the input signature).

In one embodiment, if the score is greater than or equal to a threshold, then the signature is determined (block 650) to be a match (i.e. an authenticated document). In another embodiment, if the score is greater than the threshold, then the signature is determined to be a match. This embodiment can be equivalent to the greater than or equal embodiment when threshold is lowered by one unit of accuracy.

In one embodiment, if the score is less than or equal to a threshold, then the signature is determined (block 660) to not be a match (i.e. not an authenticated document). In another embodiment, if the score is less than the threshold, then the signature is determined to not be a match. This embodiment can be equivalent to the less than or equal embodiment when threshold is increased by one unit of accuracy. Note that the matching and not matching can be reversed based on a threshold when a lower score means a greater degree of matching. Also, there may be multiple thresholds that are used to determine more than two categorizations.

In step 670, after a score is calculated, the reference representation (values) is optionally updated. Because each time a card is swiped some additional noise (error) may be introduced onto the signature (e.g. physically disturbing the magnetic particles of the magnetic stripe). This introduced error will lower the score of the authentic card with respect to the reference signature, which was obtained from an original swipe of the authentic card.

To overcome this problem, the reference signature is updated after N authentic input signatures have been received, where N may be any integer including 1. In one embodiment, the representation of each authenticated input signature is added into the reference. For example, a fixed amount (such as 10%) of the new, authenticated input signature is added into the reference. In another embodiment, the amount is weighted by the score. A higher score may cause a higher amount of that representation to be added, and lower score may cause a lower amount of that representation to be added. A normalization may be done after this adding.

In another embodiment, an artificial neural network (ANN) is used to optimize the reference signature. Other optimization methods may also be used. In one aspect, the reference is updates in such way that the error introduced in each card swiping is minimized, and therefore, the score is more accurate to detect counterfeit card. In another aspect, an optimization algorithm is used to maximize the score of the previous signatures relative to the new reference values. The error minimization or the score maximization may be performed for all previous input signatures or just for a portion of them.

Thus, the new reference values are a combination of previous input values for an authenticated signature. Accordingly, when any of the new reference values (as determined by any method herein) is compared to the input signature (e.g. coefficients), an error associated with value has contributions from each of the previous input signatures that are used to create the reference values.

Examples of parameters used in the ANN are as follows. One parameter is the target value for which the optimization strives to achieve. In one embodiment, the target value has a value close to 1. A parameter "eta" is a relatively small number (e.g. 0.01) that controls how fast the ANN converges. A parameter "delta" is a very small number (e.g. 0.0001) that is used to determine when to stop iteration of the ANN. A maximum number of iterations to be allowed in ANN may be specified to prevent runaway calculations.

In one embodiment, the correlation value from the ANN falls between −1 and 1 where a "1" implies two variables are exactly same, and a "−1" implies the worst discrepancy. In other words, the closes the output is to 1 the closer to the reference signature (i.e. a match). Therefore, the closest result to one (as is practical) may be chosen as the adapted reference signature.

In one embodiment, the score is an integer value corresponding to the output "Y" of the ANN. In one aspect, the score is 100 times Y, which is rounded to nearest whole-number. For example, if ANN outputs 0.91, then, the score is 91.

In one embodiment, because in real case "1" is almost impossible, a value may be chosen that is close to "1", e.g. 0.99. In another embodiment, during updating reference signature, the ANN optimize itself to target value with error less than delta, e.g. 0.0001.

The threshold used in block 640 may also be considered a parameter since it is used to determine whether a particular input signature is authentic. Since in one embodiment only authentic signatures (ones that match) are used to updated the reference, the threshold affects when the ANN updates the reference. Different version of the ANN may be used depending on the type of application and the type of cards to be used.

Initial test results for the ANN scores of 0.7~0.9 using 22 signatures from the same authentic card, where 1 is a perfect match. For 120 signatures obtained from different cards than the authentic card, scores were less than <0.2.

In one embodiment, the ANN is a nonlinear classifier having three layers with the middle layer being hidden. In one example, input net has 32 values, the middle net has 6 values, and the output net has 2 values.

In block 680, a new threshold is computed. In one embodiment, the threshold may simply be computed by adding the new score point, and determining a new distribution. In another embodiment, new scores for the previously calculated signature may be determined based on the new reference signature, and the new distribution can be calculated. This threshold may then be used for the next input signature that is received.

In one embodiment, the threshold is updated after the change of distribution of scores reaches a significant level compared to the distribution that was previously used to calculate the threshold. In one aspect, the change is the normalized difference at each score. Such a change may occur after scores of signature of many new swipes have been included in the distribution.

When 670 and 680 are used together, a degradation of the magnetic stripe may be accounted for. As mentioned above, over time, a magnetic stripe may have certain magnetic particles dislodged or removed, for example, by scratches. This could alter a signature. If the reference signature stayed the same, then it would be more difficult to distinguish a different card (in effect that card has become different due to the decay).

The decay may be seen as a shifting to the left of the distribution 530 of FIG. 5. The threshold could change, but the amount of false positives or negatives would still increase, resulting in less accuracy. By using block 670, the distribution 530 can be made to stay further right, thus giving a better separation from distributions resulting from different cards.

To illustrate the benefits of embodiments described herein, a simulation was performed where noise was added to signatures. Distributions using updated reference signatures and without updating the reference signature were compared.

In the simulation, a reference signature was chosen from a swipe of a card. For 50 iterations, noise was added to the reference signature. For each iteration, some amount of noise was added by randomly choosing a value in {−2, −1, 1, 2} and adding that one value to the signature at 5 random positions. Signatures for different cards (i.e. not the reference card) were obtained by swiping those cards. No noise was added to these signatures of the different.

Figure 7:
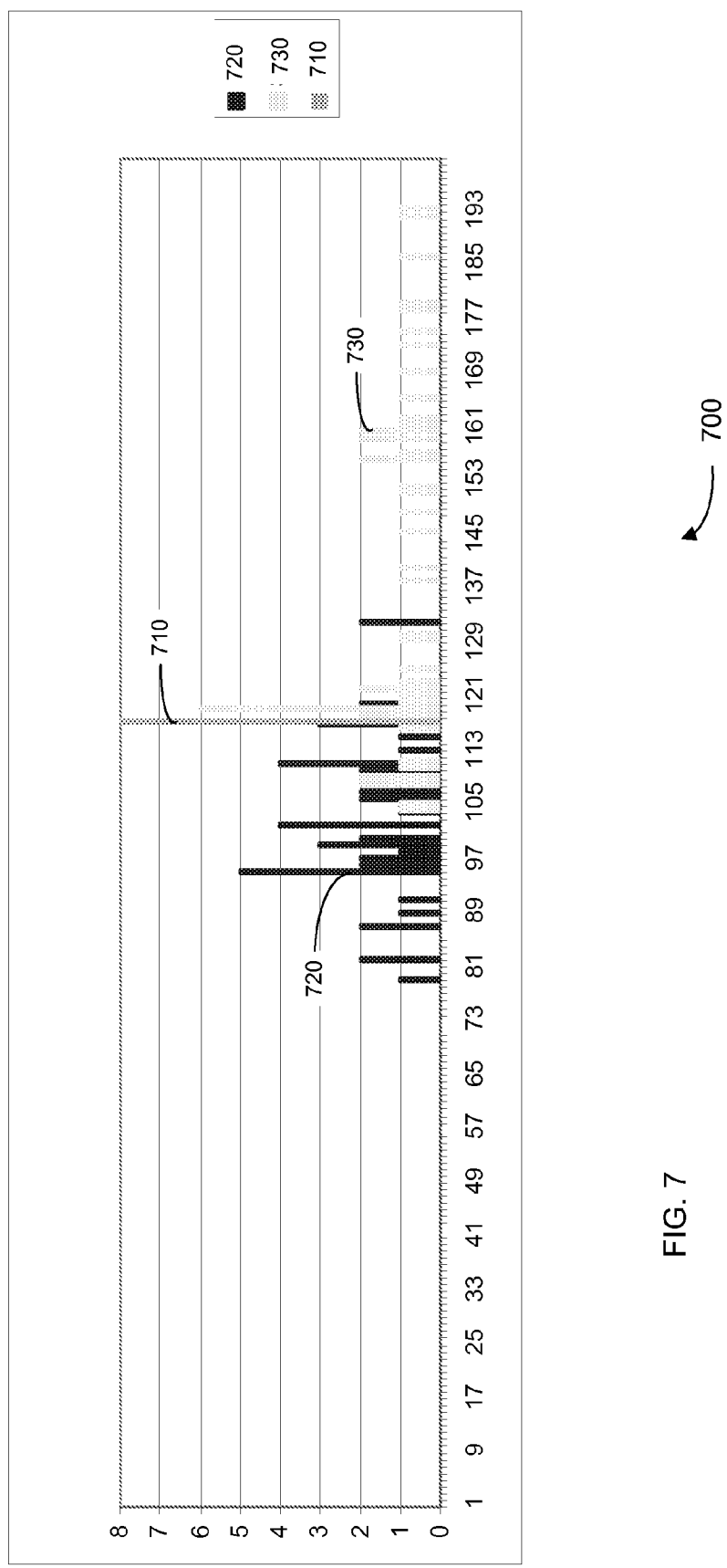
FIG. 7 is a histogram 700 showing a score distribution of a simulation using a bit-by-bit comparison of binary numbers obtained from digital samples of the magnetic signature.

FIG. 7 is a histogram 700 showing a score distribution of a simulation using a bit-by-bit comparison of binary numbers obtained from digital samples of the magnetic signature. The X axis relates a score from 0 to 200, with 200 being the best match. The Y axis is the number of signatures that had a particular score. Each of the scores is computed from the original reference signature, i.e. before adding noise to simulate additional swipes.

The scores 720 (dark data points) show the scores from different cards than the reference card. As one can see, the scores 720 are generally clustered to the left of a threshold 710, which was calculated using to minimize the false positives and false negatives (also termed the overlap). However, there are a few scores that are present to the right of the threshold 710, which is at a score of 117.

The scores 730 (lighter data points) are the scores from the signatures where noise was added to the reference signature. The scores 730 are generally clustered to the right of the threshold 710. However, there are a few that are present to the left of the threshold 710. The overlap is 16, thus there is a noticeable level of inaccuracy.

Figure 8:
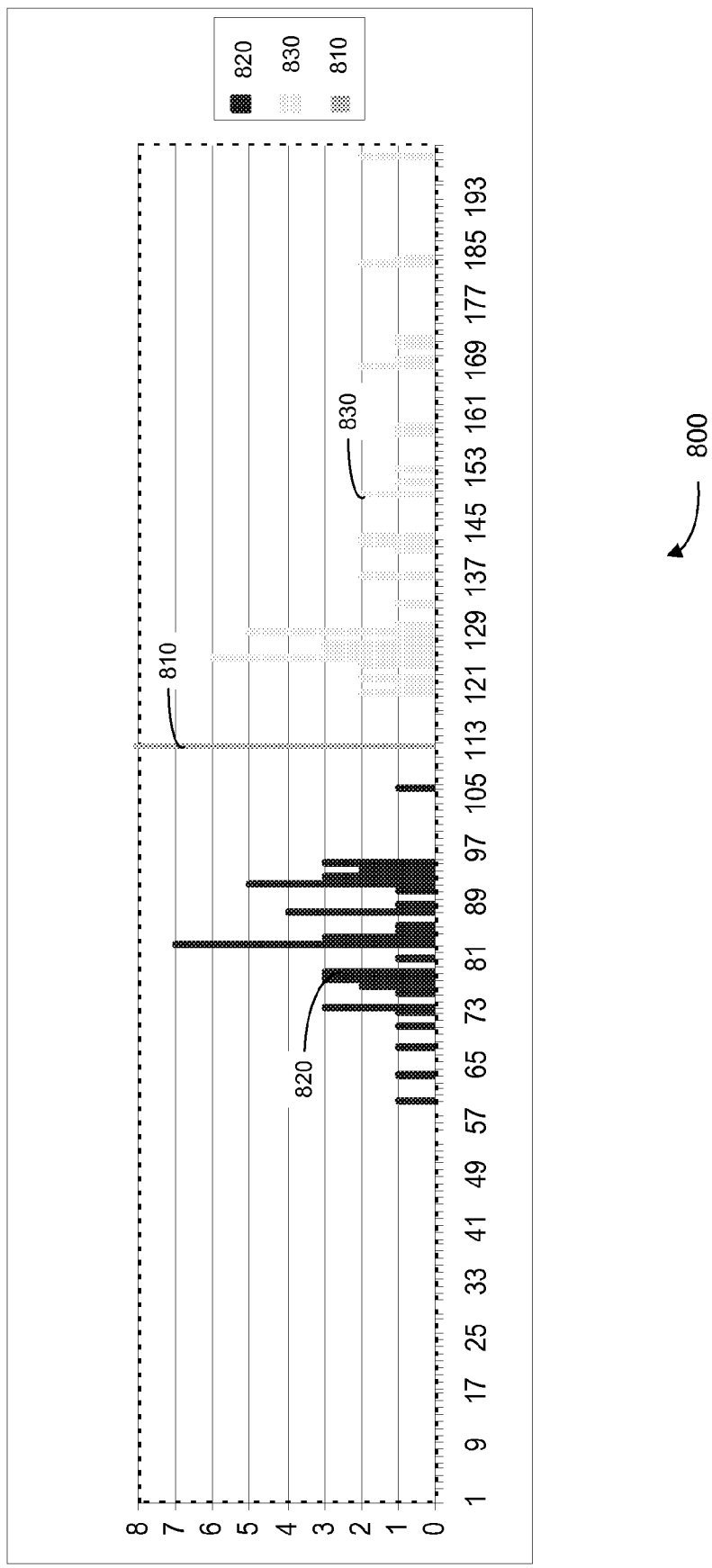
FIG. 8 is a histogram 800 showing a score distribution of a simulation where scores are calculated according to an embodiment of the present invention.

FIG. 8 is a histogram 800 showing a score distribution of a simulation where scores are calculated according to an embodiment of the present invention. The X axis and the Y axis are the same as in plot 700. The scores are calculated using an LDCT representation of the magnetic signature. The scores are also calculated using a reference signature that was updated from the original reference signature.

As one can see, the scores 820 (dark data points) from different cards are all clustered to the left of a threshold 810. The threshold 810 is based on the scores shown. Notice that there are no points that are present to the right of the threshold 810, meaning no false positives.

The scores 830 (light data points) are the scores from the signatures where noise was added to the reference signature. These scores are all clustered to the right of the threshold 810. There are no points that are present to the left of the threshold 810, which is at 112. Here all of the points are categorized accurately, as shown by a zero overlap.

Figure 9:
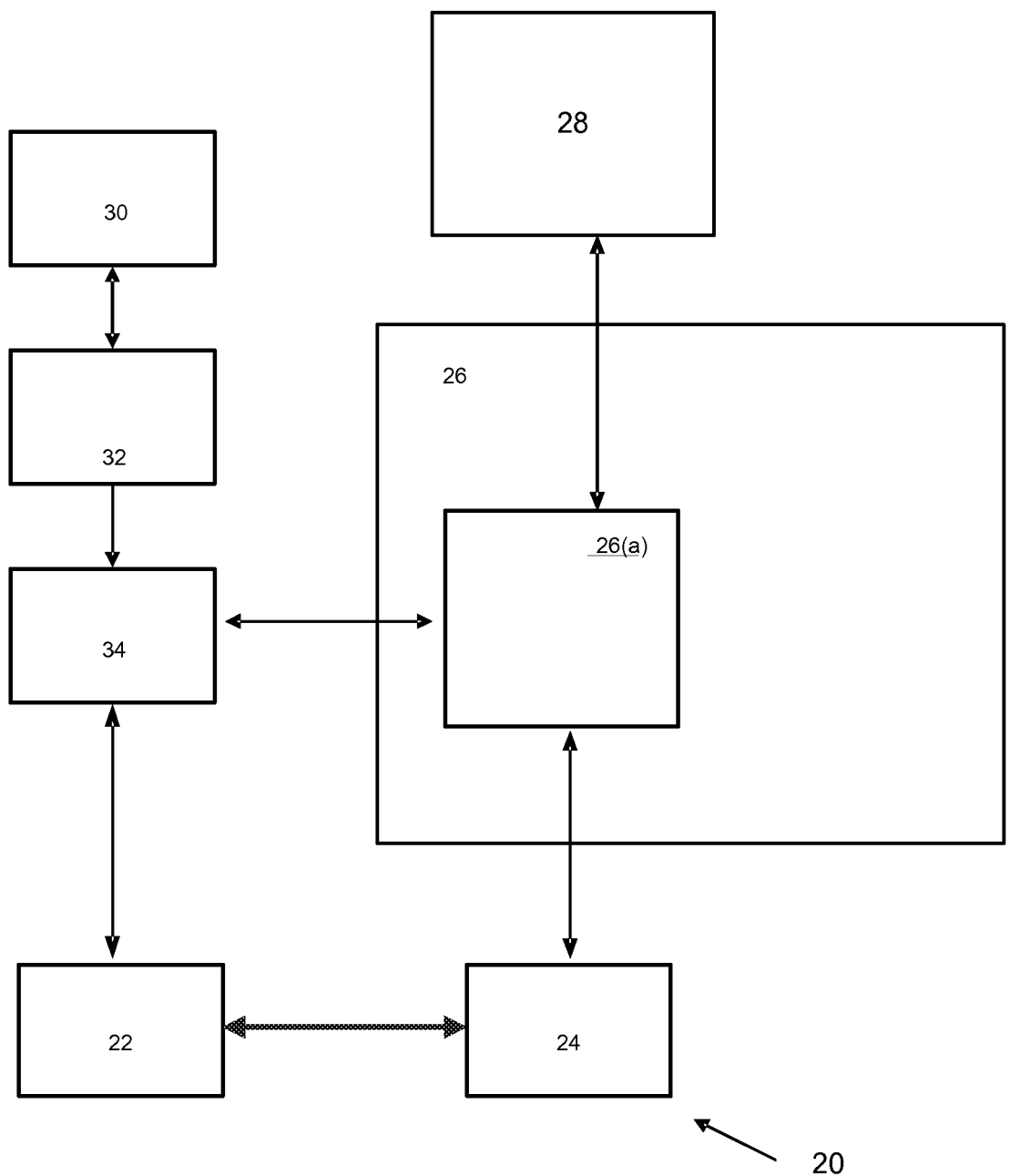
FIG. 9 shows an exemplary system 20 according to an embodiment of the invention.

FIG. 9 shows an exemplary system 20 according to an embodiment of the invention. Other systems according to other embodiments of the invention may include more or less components than are shown in FIG. 9.

The system 20 shown in FIG. 9 includes a merchant 22 and an acquirer 24 associated with the merchant 22. In a typical payment transaction, a consumer 30 may purchase goods or services at the merchant 22 using a portable consumer device 32, such as a debit card, credit card, and a smartcard. The merchant 22 could be a physical brick and mortar merchant or an e-merchant.

The consumer may interact with the payment processing network 26 and the merchant through an access device 34, such as a point of sale (POS) terminal, personal computer, and a mobile phone. The merchant 22 may also have, or may receive communications from, an access device 34 that can interact with the portable consumer device 32. The access device 34 may be part of, be, or include a computing device that includes a processor that calculates the representation of the magnetic signature for sending to an authentication device. The access device 34 may also include the authentication device.

Conventionally, an authorization request message, which may include the representation of the magnetic signature, is then forwarded to the acquirer 24, and then sent to the payment processing network 26, which may include the authentication device. The payment processing network 26 then forwards the authorization request message to the issuer 28 of the portable consumer device 32, who sends an authorization response message back to the payment processing network 26 to indicate whether or not the current transaction is authorized. Any of the entities herein (e.g. acquirer 24, payment processing network 26, or the issuer 28) may implement embodiments for authenticating a card (or other document).

For example, the payment processing network 26 may perform an authentication check, determine an authentication score, and devise a risk value, which may be based on other factors than the authentication of the magnetic signature. In this case, the authentication device may be any one or more computers in the payment processing network 26. The issuer then may use the risk value to determine whether or not the transaction is to be authorized. In another embodiment, the payment processing network 26 may determine that the card is not authenticated and then send a denial to the merchant 22 without ever contacting the issuer 28.

The payment processing network 26 can forward the authorization response message back to the acquirer 24, who then sends the response message back to the merchant 22. After the merchant 22 receives the authorization response message, the access device 34 at the merchant 22 may then provide the authorization response message for the consumer 30. The response message may be displayed by the access device 34 or the portable consumer device 32, or may be printed out on a receipt. The response message may include a denial for a transaction based on the card not being authenticated.

At the end of the day, a normal clearing and settlement process can be conducted by the payment processing network 26. A clearing process is a process of exchanging financial details between and acquirer and an issuer to facilitate posting to a consumer's account and reconciliation of the consumer's settlement position.

As used herein, an "acquirer" is typically a business entity, e.g., a commercial bank that has a business relationship with a particular merchant or an ATM. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The consumer 30 may be an individual, or an organization such as a business that is capable of purchasing goods or services. In other embodiments, the consumer 30 may simply be a person who wants to conduct some other type of transaction such as a money transfer transaction or a transaction at an ATM.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), etc. Other examples of portable consumer devices include, payment cards, security cards, and access cards, and the like. The portable consumer devices can also be debit devices (e.g., a debit card), credit devices (e.g., a credit card), or stored value devices (e.g., a stored value card).

The access devices 34 according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet. The issuer 28 may be a bank or other organization that may have an account associated with the consumer 30. The issuer 28 may operate a server.

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

Figure 10:
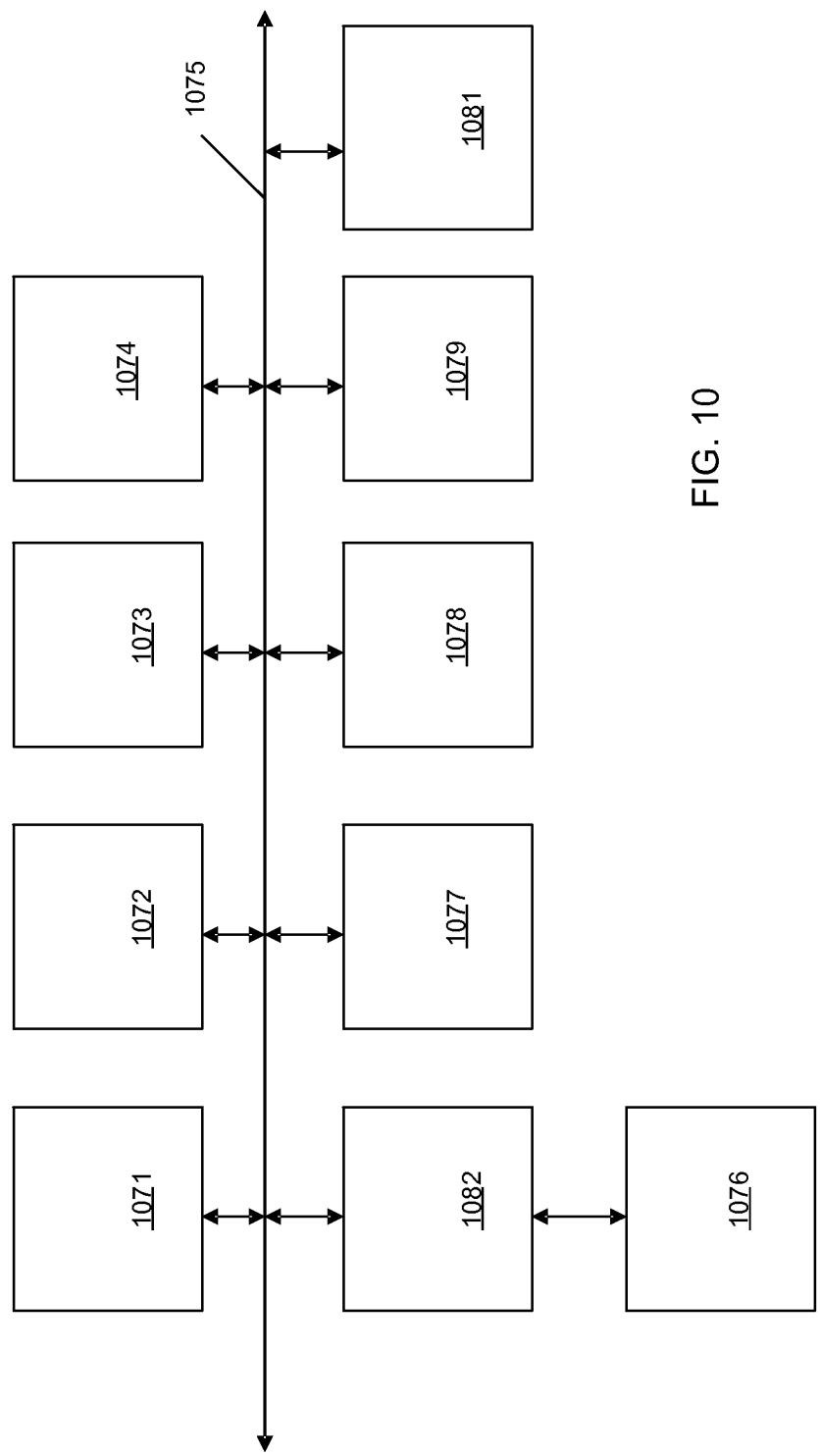
FIG. 10 shows components or subsystems of a computer apparatus that may be used to perform or be parts of embodiments of the present invention.

FIG. 10 shows components or subsystems of a computer apparatus that may be used to perform or be parts of embodiments of the present invention. For example, such components or any subset of such components may be present in various components shown in FIG. 9, including the access device 34, server computers 26(*a*), 28(*a*), etc. The subsystems shown in FIG. 10 are interconnected via a system bus 1075. Additional subsystems such as a printer 1074, keyboard 1078, fixed disk 1079, monitor 1076, which is coupled to display adapter 1082, and others are shown. Peripherals and input/output (I/O) devices, which couple to I/O controller 1071, can be connected to the computer system by any number of means known in the art, such as serial port 1077. For example, serial port 1077 or external interface 1081 can be used to connect the computer apparatus to a wide area network such as the Internet, a mouse input device, or a scanner. The interconnection via system bus 1075 allows the central processor 1073 to communicate with each subsystem and to control the execution of instructions from system memory 1072 or the fixed disk 1079, as well as the exchange of information between subsystems. The system memory 1072 and/or the fixed disk 1079 may embody a computer readable medium.

Embodiments of the invention provide for a number of advantages. For example, less bandwidth (while no compromising accuracy) is required since the data points are transformed to a function space that can more efficiently describe the magnetic characteristic (i.e. fingerprint, signature). Also, embodiments account for the degradation of a card, thus maintaining accuracy over time.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for authenticating a document that includes a magnetic stripe having a distinct magnetic noise characteristic, wherein the magnetic noise characteristic exists over one or more predetermined segments of the magnetic stripe, the method comprising:
   receiving, at an authentication device, a set of values representing a present magnetic noise characteristic of the document;
   comparing the received values to reference values, wherein the comparing includes:
      determining an error for each received value, wherein each error includes a sum of contributions, each contribution corresponding to a respective set of previously received values representing a previous magnetic noise characteristic of the document, each respective set of previously received values being received at a different time as part of a respective authentication of the document;
   based on the comparison, providing a measure of an authenticity of the document; and
   updating the reference values with the received set of values representing the present magnetic noise characteristic, wherein the present magnetic noise characteristic includes additional noise introduced into the magnetic stripe resulting from use of the document since a prior update of the reference values.

2. The method of claim 1, wherein each contribution includes a difference between a received value and a corresponding value of a respective set of previously received values.

3. The method of claim 2, wherein each contribution includes a respective weighting factor multiplied by a corresponding difference.

4. The method of claim 1, wherein determining an error for each received value includes:
   calculating a sum of the corresponding values of the previously received sets; and determining a difference between the received value and the corresponding sum.

5. The method of claim 1, further comprising:
comparing the measure to a threshold to determine a category of authenticity of the documents; and
updating the threshold based on the received values.

6. The method of claim 5, further comprising:
receiving one or more additional sets of values representing the magnetic noise characteristic; and
computing respective measures for each additional set of values, wherein the threshold is updated after a change of a distribution of measures reaches a predetermined level.

7. The method of claim 1, further comprising:
calculating new reference values using the received values.

8. The method of claim 7, wherein calculating new reference values involves using an optimization algorithm.

9. The method of claim 8, wherein the optimization algorithm minimizes a total error resulting from comparing a plurality of sets of received values to the new reference values or maximizes the measure of authenticity for a plurality of sets of received values compared to the new reference values.

10. The method of claim 7, wherein the received values used to calculate the new reference values are received values for the document that has previously been authenticated.

11. The method of claim 10, wherein the new reference values are created after N authentic input signatures have been received.

12. A computer program product comprising a computer readable medium encoded with a plurality of instructions for controlling a computing system to perform a method for authenticating a document that includes a magnetic stripe having a distinct magnetic noise characteristic, wherein the magnetic noise characteristic occurs over one or more predetermined segments of the magnetic stripe, the instructions comprising:
receiving a set of values representing a present magnetic noise characteristic of the document;
comparing the received values to reference values, wherein the comparing includes:
determining an error for each received value, wherein each error includes a sum of contributions, each contribution corresponding to a respective set of previously received values representing a previous magnetic noise characteristic of the document, each respective set of previously received values being received at a different time as part of a respective authentication of the document;
based on the comparison, providing a measure of an authenticity of the document; and
updating the reference values with the received set of values representing the present magnetic noise characteristic, wherein the present magnetic noise characteristic includes additional noise introduced into the magnetic stripe resulting from use of the document since a prior update of the reference values.

13. The computer program product of claim 12, wherein each contribution includes a difference between a received value and a corresponding value of a respective set of previously received values.

14. The computer program product of claim 12, wherein determining an error for each received value includes:
calculating a sum of the corresponding values of the previously received sets; and
determining a difference between the received value and the corresponding sum.

15. The computer program product of claim 12, further comprising:
comparing the measure to a threshold to determine a category of authenticity of the documents; and
updating the threshold based on the received values.

16. The computer program product of claim 12, further comprising:
calculating new reference values using the received values.

17. A system for authenticating a document that includes a magnetic stripe having a distinct magnetic noise characteristic, wherein the magnetic noise characteristic occurs over one or more predetermined segments of the magnetic stripe, the system comprising:
an input for receiving a set of values representing a present magnetic noise characteristic of the document;
a processor communicably coupled with the input, the processor configured to:
compare the received values to reference values, wherein the comparing includes:
determining an error for each received value, wherein each error includes a sum of contributions, each contribution corresponding to a respective set of previously received values representing a previous magnetic noise characteristic of the document, each respective set of previously received values being received at a different time as part of a respective authentication of the document;
based on the comparison, provide a measure of an authenticity of the document; and
updating the reference values with the received set of values representing the present magnetic noise characteristic, wherein the present magnetic noise characteristic includes additional noise introduced into the magnetic stripe resulting from use of the document since a prior update of the reference values.

18. The system of claim 17, wherein each contribution includes a difference between a received value and a corresponding value of a respective set of previously received values.

19. The system of claim 17, wherein determining an error for each received value includes:
calculating a sum of the corresponding values of the previously received sets; and
determining a difference between the received value and the corresponding sum.

20. The system of claim 17, wherein the processor is further configured to:
comparing the measure to a threshold to determine a category of authenticity of the documents; and
updating the threshold based on the received values.

21. The system of claim 17, wherein the processor is further configured to:
calculate new reference values using the received values.

* * * * *